(12) United States Patent
Chin et al.

(10) Patent No.: US 9,503,847 B2
(45) Date of Patent: Nov. 22, 2016

(54) ELECTRONIC APPARATUS, UPLOADING METHOD AND NON-TRANSITORY COMPUTER READABLE STORAGE MEDIUM THEREOF

(71) Applicant: HTC Corporation, Taoyuan (TW)

(72) Inventors: Ssu-Po Chin, Taoyuan (TW); Yung-Chao Tseng, Taoyuan (TW); Hsin-Ti Chueh, Taoyuan (TW); Chien-Nan Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/695,040

(22) Filed: Apr. 23, 2015

(65) Prior Publication Data

US 2016/0316320 A1 Oct. 27, 2016

(51) Int. Cl.
 *H04W 4/02* (2009.01)
 *H04W 52/02* (2009.01)
 *H04L 12/26* (2006.01)

(52) U.S. Cl.
 CPC ............... *H04W 4/02* (2013.01); *H04L 43/16* (2013.01); *H04W 52/0251* (2013.01)

(58) Field of Classification Search
 CPC .... H04W 4/02; H04W 52/0251; H04L 43/16
 See application file for complete search history.

(56) References Cited

U.S. PATENT DOCUMENTS

| | | | |
|---|---|---|---|
| 2004/0098414 A1* | 5/2004 | Chan | H04L 67/06 |
| 2007/0260691 A1 | 11/2007 | Kallqvist et al. | |
| 2012/0296946 A1* | 11/2012 | Goto | H04L 67/06 707/827 |
| 2012/0331394 A1* | 12/2012 | Trombley-Shapiro | H04L 67/06 715/748 |
| 2013/0282869 A1* | 10/2013 | Mate | H04L 67/325 709/219 |
| 2014/0280327 A1* | 9/2014 | Pham | G06F 19/18 707/770 |

FOREIGN PATENT DOCUMENTS

| | | |
|---|---|---|
| CN | 102685159 A | 9/2012 |
| EP | 1787213 A2 | 5/2007 |
| TW | 200941977 A | 10/2009 |
| WO | 2004114639 A1 | 12/2004 |

OTHER PUBLICATIONS

Corresponding extended European Search Report that this art reference was cited on Dec. 1, 2015.
Corresponding Taiwanese Office Action that these art references were cited on Aug. 8, 2016.

* cited by examiner

*Primary Examiner* — Kashif Siddiqui
(74) *Attorney, Agent, or Firm* — CKC & Partners Co., Ltd.

(57) ABSTRACT

An uploading method for an electronic apparatus includes: determining whether a current location of the electronic apparatus is recorded on an allowed network information list stored in a storage device; if the current location of the electronic apparatus is recorded on the allowed network information list, uploading the group of files according to an allowed network configuration corresponding to the current location; and if the current location of the electronic apparatus is not recorded on the allowed network information list, performing a network selecting process related to the current location.

17 Claims, 7 Drawing Sheets

| recorded location | recorded network configuration |
|---|---|
| A | network type: 3G<br>network bandwidth: 1 MB/sec.<br>connection time: 5 mins. |
| B | network type: LTE<br>network bandwidth: 10 MB/sec.<br>connection time: 3 mins. |
| ... | |

ELECTRONIC APPARATUS, UPLOADING METHOD AND NON-TRANSITORY COMPUTER READABLE STORAGE MEDIUM THEREOF

BACKGROUND

Field of Invention

The present invention relates to an electronic apparatus, an operating method and computer readable storage medium thereof. More particularly, the present invention relates to an electronic apparatus capable of uploading data and an operating method thereof.

Description of Related Art

The Internet cloud server is increasing popular, more and more software applications and users upload the data to the cloud server, such as photos, videos or documents. Therefore, with advances in information technology, electronic apparatus are widely used in our daily lives.

A typical electronic apparatus may be used to transmit data to the other device, such as a remote computer or a cloud system. The conventional electronic apparatus can be a mobile device or a wearable device. However, the battery power of the conventional device drops very fast when the conventional electronic apparatus uploads the files.

SUMMARY

One aspect of the present disclosure is related to an uploading method for an electronic apparatus. The method includes: determining whether a current location of the electronic apparatus is recorded on an allowed network information list stored in a storage device; if the current location of the electronic apparatus is recorded on the allowed network information list, uploading the group of files according to an allowed network configuration corresponding to the current location; and if the current location of the electronic apparatus is not recorded on the allowed network information list, performing a network selecting process related to the current location.

Another aspect of the present disclosure is related to an electronic apparatus. In accordance with one embodiment of the present disclosure, the mobile device includes a storage device, an input unit, a processor, and a network component. The input unit inputs a group of files for uploading. The processor determines whether a total file size of the group of files is larger than a first threshold or a total file number of the group of files is larger than a second threshold. The network component selectively uploads the group of files according to a current status of the electronic apparatus. If the total file size of the group of files is larger than the first threshold or the total file number of the group of files is larger than the second threshold.

Another aspect of the present disclosure is related to a non-transitory computer readable medium for performing an uploading method. The method includes: determining whether a total file size of the group of files is larger than a first threshold and/or a total file number of the group of files is larger than a second threshold by a processor; if the total file size of the group of files is larger than the first threshold and/or the total file number of the group of files is larger than the second threshold, selectively uploading the group of files according to a current status of the electronic apparatus.

Through utilizing one embodiment described above, uploading the group of data can save more power consumption to avoid battery power dropping fast when it uploading the files.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, when an element is referred to as being "connected" or "electrically connected" to another element, it can be directly connected to the other element or intervening elements may be present. In contrast, when an element is referred to as being "directly connected" to another element, there are no intervening elements present. Moreover, "electrically connect" or "connect" can further refer to the interoperation or interaction between two or more elements.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. §112(f). In particular, the use of "step of" in the claims herein is not intended to invoke the provisions of 35 U.S.C. §112(f).

Figure 1:
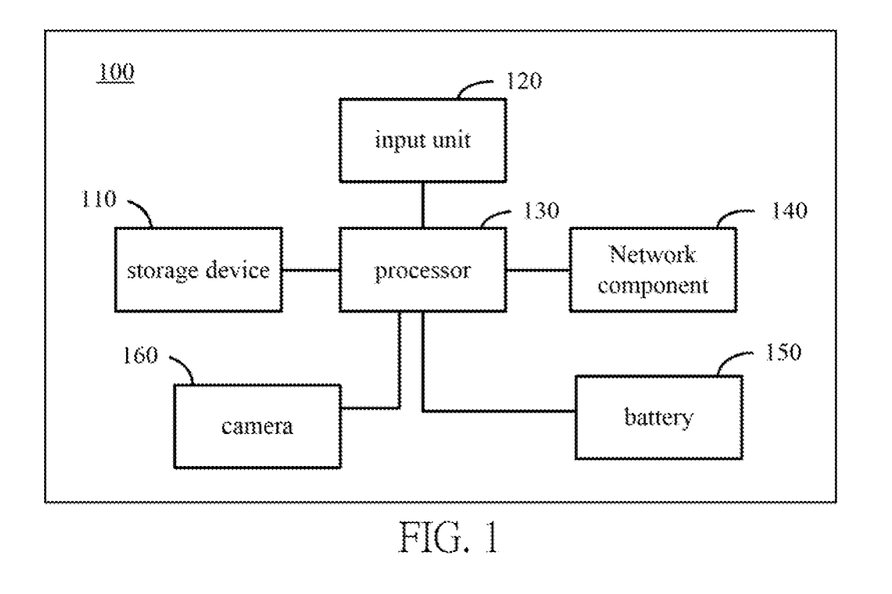
FIG. 1 is a schematic diagram of an electronic apparatus according to one embodiment of the present invention.
Figure 2A:
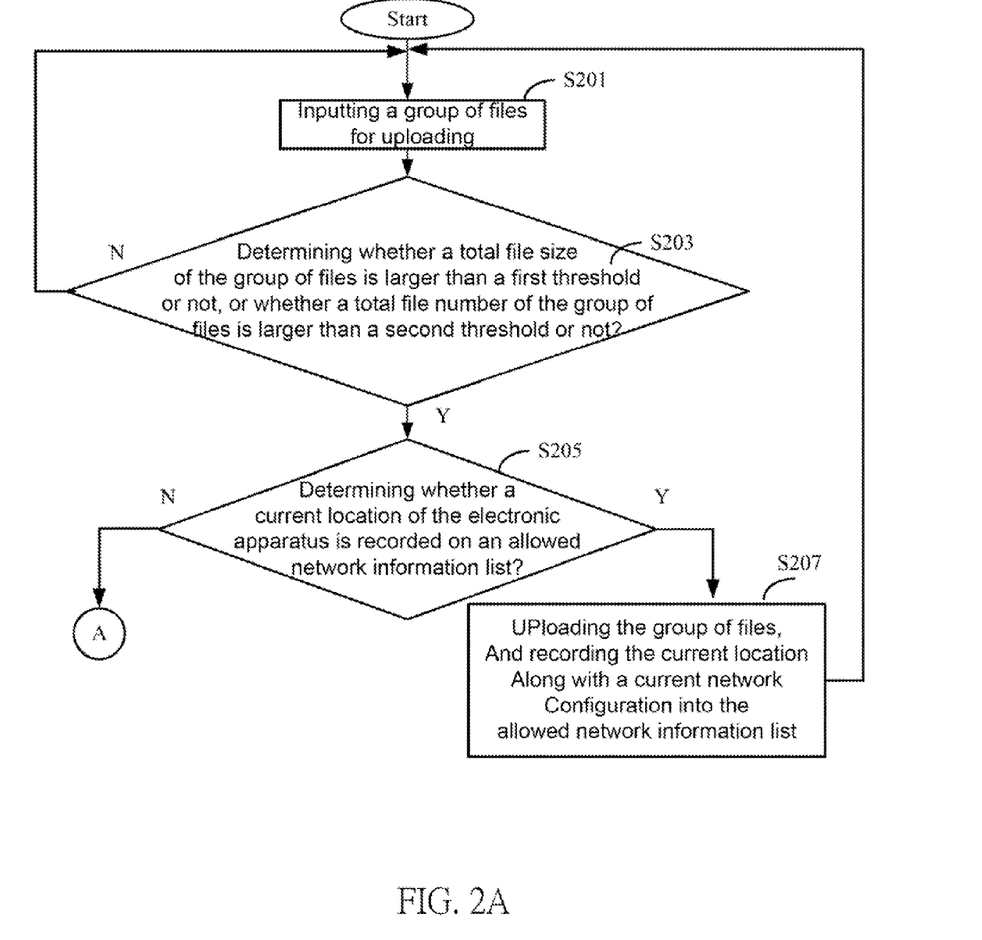
FIGS. 2A-2B are flowcharts of an uploading method according to one embodiment of the present invention.
Figure 2B:
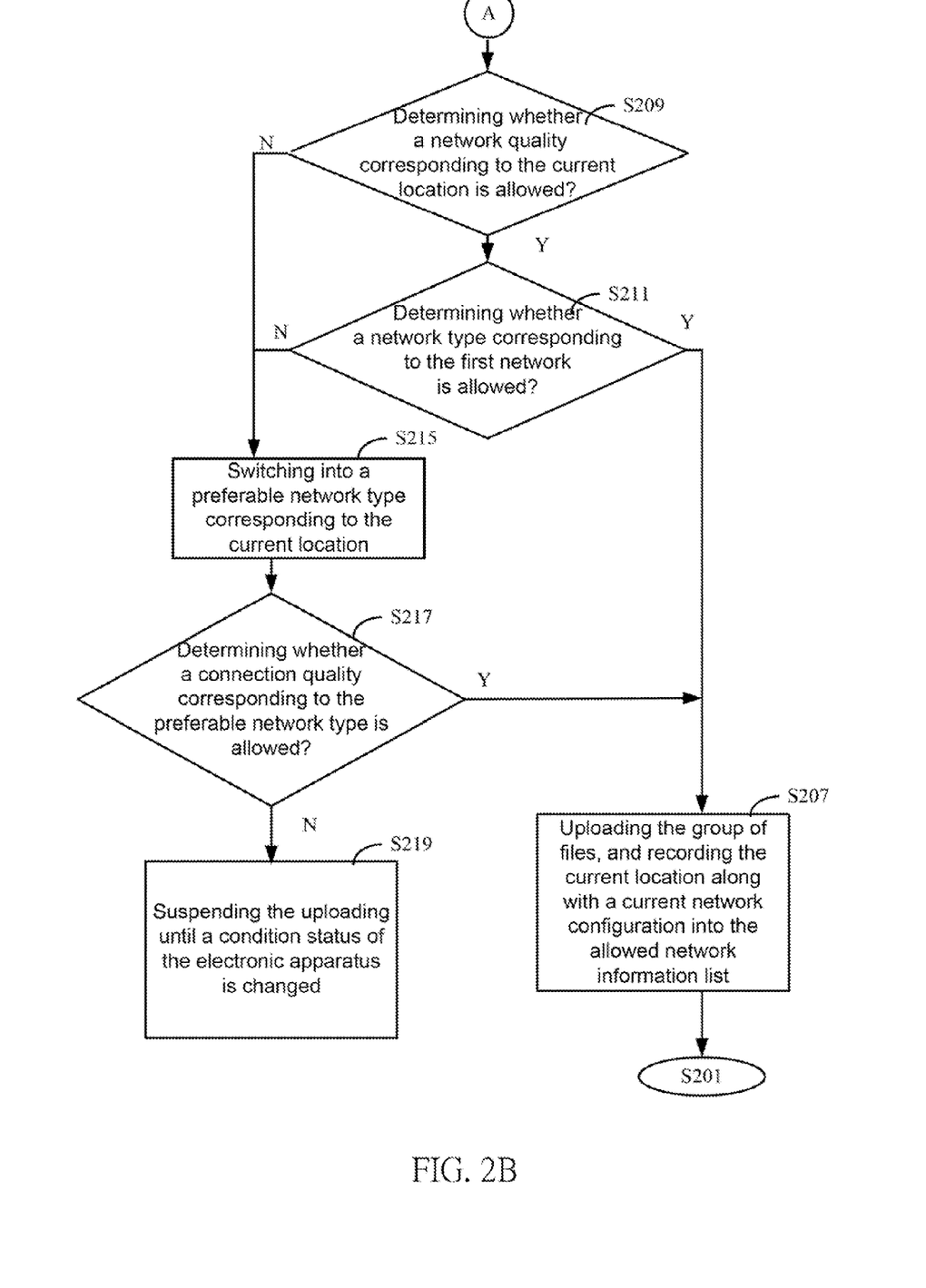
Figure 3:
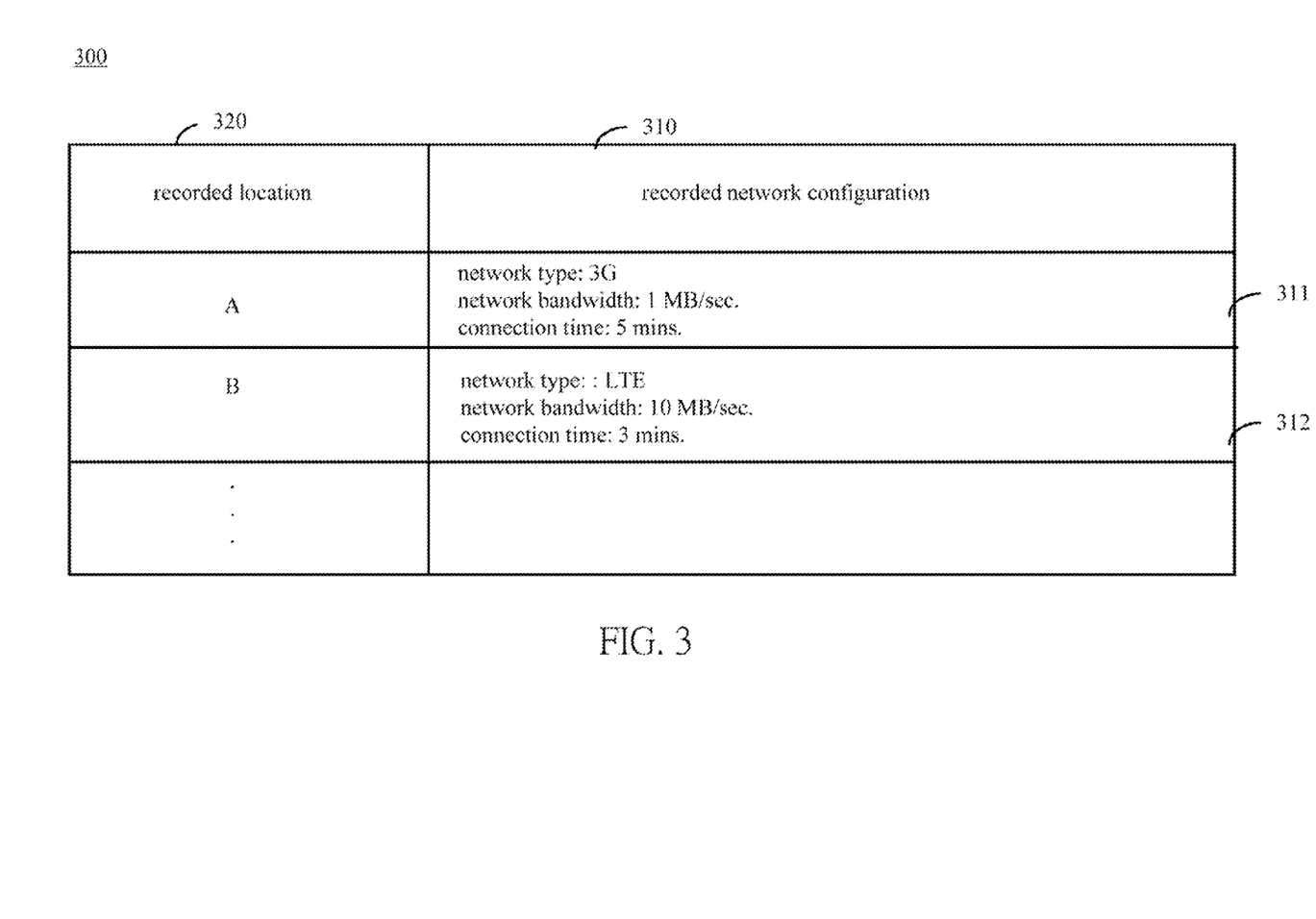
FIG. 3 is an allowed network information list according to one embodiment of the present invention.

Reference is made to FIGS. 1-3. FIG. 1 is a schematic diagram of an electronic apparatus 100 according to one embodiment of the present invention. FIGS. 2A-2B are flowcharts of an uploading method according to one embodiment of the present invention. FIG. 3 is an allowed network information list according to one embodiment of the present invention.

In this embodiment, the electronic apparatus 100 includes a storage device 110, an input unit 120, a processor 130, and a network component 140. In this embodiment, the electronic apparatus 100 can be any kinds of electronic apparatus with network function, e.g. a mobile device or a wearable device. The storage device 110 is used for storing information. The storage device 110 can be a memory, a disk, a storage media, or a memory card, etc., which can be used for storing information, and the storage device 110 even can be a remote connection device. The input unit 120 is used for receiving the inputted signal from the user. For example, the input unit 120 can be a electric wiring, touch panel or a circuit on the circuit board, or signal cables. The processor 130 is used for performing the kinds of the calculations and controlling processes. For instance, the processor 130 can be a micro chip, a central processing unit (CPU) or a firmware circuitry. The network component 140 is used for transmitting or receiving the data from the network. The network component 140 may be realized by, for example, a wireless signal IC. In addition the network component 140 could provide the network connection functions. For example Wi-Fi (Wireless Fidelity), wimax (Worldwide Interoperability for Microwave Access), GSM (2G, TDMA based communication network), GPRS (2.5G), EDGE (2.75G), WCDMA (3G, CDMA based communication network), LTE (4G, OFDMA based communication network), etc. In another embodiment, the electronic apparatus 100 may selectively include a battery 150. The battery is used for providing power to the electronic apparatus 100.

The processor 130 generates a group of files and identifies the group of files for uploading. In one embodiment, the group of files can be generated while user captures photos or videos by the camera 160. In another embodiment, the group of files could be any file generated by the processor 130 while user operates on the electronic device. The processor 130 determines whether a total file size of the group of files is larger than a first threshold and/or a total file number of the group of files is larger than a second threshold. The network component 140 selectively uploads the group of files according to a current status of the electronic apparatus 100.

If the total file size of the group of files is less than the first threshold (e.g., the total file size is less than 10 megabytes) and/or the total file number of the group of files is less than the second threshold (e.g., there is only one file in the group), these files will be hold and suspended from being uploaded. If the total file size of the group of files exceeds the first threshold or the total file number of the group of files exceeds the second threshold, the group of files will be uploaded by the electronic apparatus 100 at once.

Through determining whether the total file size is larger than a first threshold or not, or whether a total file number of the group of files is larger than a second threshold or not, the electronic apparatus 110 uploads the group of data satisfied with at least a certain amount. In this way, there is no need for the electronic apparatus 100 to separately upload each file individually. Thus, the electronic apparatus 100 can reduce more power consumption and achieve a better power efficiency.

In the following paragraphs, details of the present disclosure are provided with reference to an uploading method shown in FIGS. 2A-2B. However, the present disclosure is not limited to the embodiment below.

The uploading method shown in FIGS. 2A-2B can be applied to an electronic apparatus having a structure that is the same as or similar to the structure shown in FIG. 1. To simplify the description below, in the following paragraphs, the embodiment shown in FIG. 1 will be used as an example to describe the uploading method shown in FIGS. 2A-2B according to an embodiment of the present disclosure. However, the present disclosure is not limited to application to the embodiment shown in FIG. 1.

In addition, it should be noted that, in the steps of the following uploading method, no particular sequence is required unless otherwise specified. Moreover, the following steps also may be performed simultaneously or the execution times thereof may at least partially overlap.

Furthermore, the steps of the following uploading method may be added, replaced, and/or eliminated as appropriate, in accordance with various embodiments of the present disclosure.

In this embodiment, the uploading method shown in FIGS. 2A-2B includes the steps below.

In step S201, the processor 130 generates a group of files. In one embodiment, the processor 130 automatically generates a group of files when the camera 160 captures photo or video. In another embodiment, the processor 130 periodically checks whether a photo or video is captured. If the photo or video is captured, the processor 130 collect the captured photos/videos into a group of files, such that the group of files is automatically generated.

In step S203, the processor 130 determines whether a total file size of the group of files is larger than a first threshold or not, or whether a total file number of the group of files is larger than a second threshold or not, and the group of files has not been uploaded yet by now.

For an demonstrational example, there are 8 files generated in step S201, and the total file size of these files is 30 MB. In this demonstrational example, the first threshold is determined as 20 MB and the second threshold is determined as 10 files. As such, the total file size of the group (30 MB) is larger than the first threshold (20 MB). Thus, the processor 130 determines the total file size of the group of files is larger than the first threshold, the network component 140 selectively uploads the group of files according to a current status of the electronic apparatus 100. The step of selectively uploading the group of files is further described as following steps S205-S219. However, the disclosure is not limited to upload according to the total file size.

In another demonstrational example, there are 15 files generated in step S201, and the total file size of these files is 17 MB. In this demonstrational example, the first threshold is determined as 20 MB and the second threshold is determined as 10 files. As such, the total file number of the group (15 files) is larger than the second threshold (10 files). Thus, the processor 130 determines the total file number of the group of files is larger than the second threshold, the network component 140 selectively uploads the group of files according to a current status of the electronic apparatus 100.

In another demonstrational example, the first threshold is determined as 20 MB, and the second threshold is determined as 10 files. As such, the total file size of the group (30 MB) is larger than the first threshold (20 MB). Besides, the group of files totally contains 15 files, it means the total file number of the group of files (15 files) is larger than the second threshold (10 files). Similarly, the network component 140 selectively uploads the group of files according to a current status of the electronic apparatus 100.

In aforesaid demonstrational examples, one of the total file size and the total file size is configured to trigger the uploading function in a "OR" logic. However, the disclosure is not limited thereto. In another example, both of the total file size (larger than the first threshold) and the total file size (larger than the second threshold) are considered as a necessary condition to upload.

On the other hand, when the total file size of the group of files is not larger than the first threshold, or when the total file number of the group of files is not larger than the second threshold (or when both of the total file size and the total file number is not larger than their corresponding threshold in a further embodiment), the method goes back to step S201 to wait for receiving more data.

In step S205, the processor 130 further determines whether a current location of the electronic apparatus 100 is recorded on an allowed network information list stored in the storage device 110. If the current location of the electronic apparatus 100 is recorded on the allowed network information list, the step S207 is performed.

In step S207, the network component 140 further uploads the group of files, and the storage device 110 records the current location along with a current network configuration into the allowed network information list 300. After step S207, the next step goes back to S201 for next upload process cycle.

For example, in FIG. 3, the allowed network information list 300 is used for recording the recorded network configuration 310 corresponding to the recorded location 320 as mentioned in step S207. These recorded network configurations 310 have nice connection ability. In one embodiment, the recorded network configurations 310 may include at least one of the network type (e.g. Wi-Fi, WiMax, 2G, 2.5G, 2.75G, 3G, LTE), network bandwidth, connection time, connection speed and power saving factor. According to the allowed network information list 300, the processor 130 compares the current location of the electronic apparatus 100 to the recorded locations 320 as mentioned in step 205. If there the current location is the same as one of the recorded locations 320 (e.g. the current location is 'A'), the processor 130 determines that the current location is recorded on an allowed network information list 300. In this way, the recorded network configuration 311 corresponding to the current location can be used for uploading the group of data. Then, the network component 140 uploads the group of files and records the current location along with a current network configuration into the allowed network information list 300 for refreshing information, in one embodiment, the current network configuration further includes the information of a current time, a current power consumption and a current data amount.

On the other hand, in step 205, if the current location of the electronic apparatus 100 is not recorded on the allowed network information list 300, the processor performs a network selecting process related to the current location.

The network selecting process is further described as following steps S209-S219.

In step S209, the processor 130 further determines whether a network quality corresponding to a first network established and currently connected by the electronic apparatus at the current location is allowed. In step S211, the processor 130 determines whether a network type corresponding to the first network is allowed.

In one embodiment, in step S209, the network quality is determined by measuring error rate, RSSI (Received Signal Strength Indication), or SNR (Signal to Noise Ratio). The step S209 rejects uploading data by the first network while the first network having a larger error rate, a poor RSSI or a poor SNR. For example, if the error rate of the first network is larger than an error rate threshold, the RSSI of the first network is smaller than a RSSI threshold, or the SNR of the first network is smaller than a SNR threshold, the processor 130 rejects uploading data by the first network.

In step S211, the network type is allowed for example when the first network does not belong to the 2G (second generation), 2.5G and 2.75G wireless network. In another word, the step S211 rejects uploading data by the first network while the first network belongs to the network type of 2G, 2.5G and 2.75G. In contrast, if the first network belongs to the network type, which has higher bandwidth capability, such as Wi-fi, Wimax, 3G, 4G, might be allowed.

In contrast, if the network quality corresponding to a first network established by the electronic apparatus at the current location is allowed and the network type corresponding to the first network is allowed, the step S207 is performed.

In step S207, the network component 140 uploads the group of files and records the current location along with a current network configuration into the allowed network information list 300. In one embodiment, due to the network type and the network quality of the first network are allowed, the network component 140 can upload the group of files by the first network.

In another aspect, if the network quality corresponding to a first network established by the electronic apparatus at the current location is not allowed in step S209, or the network type corresponding to the first network is not allowed in step S211, the step S215 is performed.

In step S215, the network component 140 switches into a preferable network type corresponding to the current location. In one embodiment, the processor 130 selects the preferable network type according to a predetermined network type list. The predetermined network type list records the different kinds of network types by a preferable order, such as Wi-Fi, LTE, 3G. In one embodiment, the processor 130 selects the preferable network type having the biggest bandwidth according to the predetermined network type list. In another embodiment, the processor 130 selects the preferable network type having the biggest RSSI.

In step S217, the processor 130 determines whether a connection quality corresponding to the preferable network type is allowed. In one embodiment, if the processor 130 determines the connection quality corresponding to the preferable network type is allowed, the step S207 is performed. In the step S207, the network component 140 uploads the group of files, and the storage device 110 records the current location along with a current network configuration into an allowed network information list.

In another embodiment, if the connection quality corresponding to the preferable network type is allowed, step S405 (see FIG. 4C) is further performed. In step S405, the processor 130 determines whether the power percentage of the battery 150 is higher than a power threshold. If the power percentage of the battery 150 is higher than the power threshold, it means the power is in a nice condition for uploading. And the step S207 is performed. In the step S207, the network component 140 uploads the group of files, and the storage device 110 records the current location along with a current network configuration into an allowed network information list. In contrast, if the power percentage of the battery 150 is not higher than the power threshold, the step S406 is performed. In step S406, the storage device 110 records the current location along with a current network configuration into a temporal list. By performing step S406, the connection quality corresponding to the preferable network type determined in step S217 and the preferable network type corresponding to the current location determined in step S215 can also be recorded into the temporal list. The information stored in the temporal list can be used as historical data for the subsequent steps.

In contrast, if the connection quality corresponding to the preferable network type is not allowed, step S219 is performed.

In step S219, the processor 130 suspends the uploading until a condition status of the electronic apparatus is changed. In one embodiment, the condition status includes at least one of network status (e.g. network type, network bandwidth, connection time, connection speed), network providers and the current location. In another embodiment, the processor 130 suspends the uploading after a period of time. For instance, if the processor 130 detects that the location of the electronic apparatus 100 is changed, the processor 130 stops suspending. And then, the method goes back to the step S205.

Accordingly, by the method above described, the current location of the electronic apparatus 140, the network quality, the network type and the network configuration are fully considered. Besides, the method helps to saves more power consumption by uploading a group of data under the determined condition.

It should be noted that, the uploading method can be implemented by electronic apparatus 100 in the embodiment described above, or can be implemented as a computer program stored in a non-transitory computer readable medium to be read for controlling a computer or an electronic apparatus to execute the uploading method above mentioned in FIGS. 2-3. The computer program can be stored in a non-transitory computer readable medium such as a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this invention pertains.

Figure 4A:
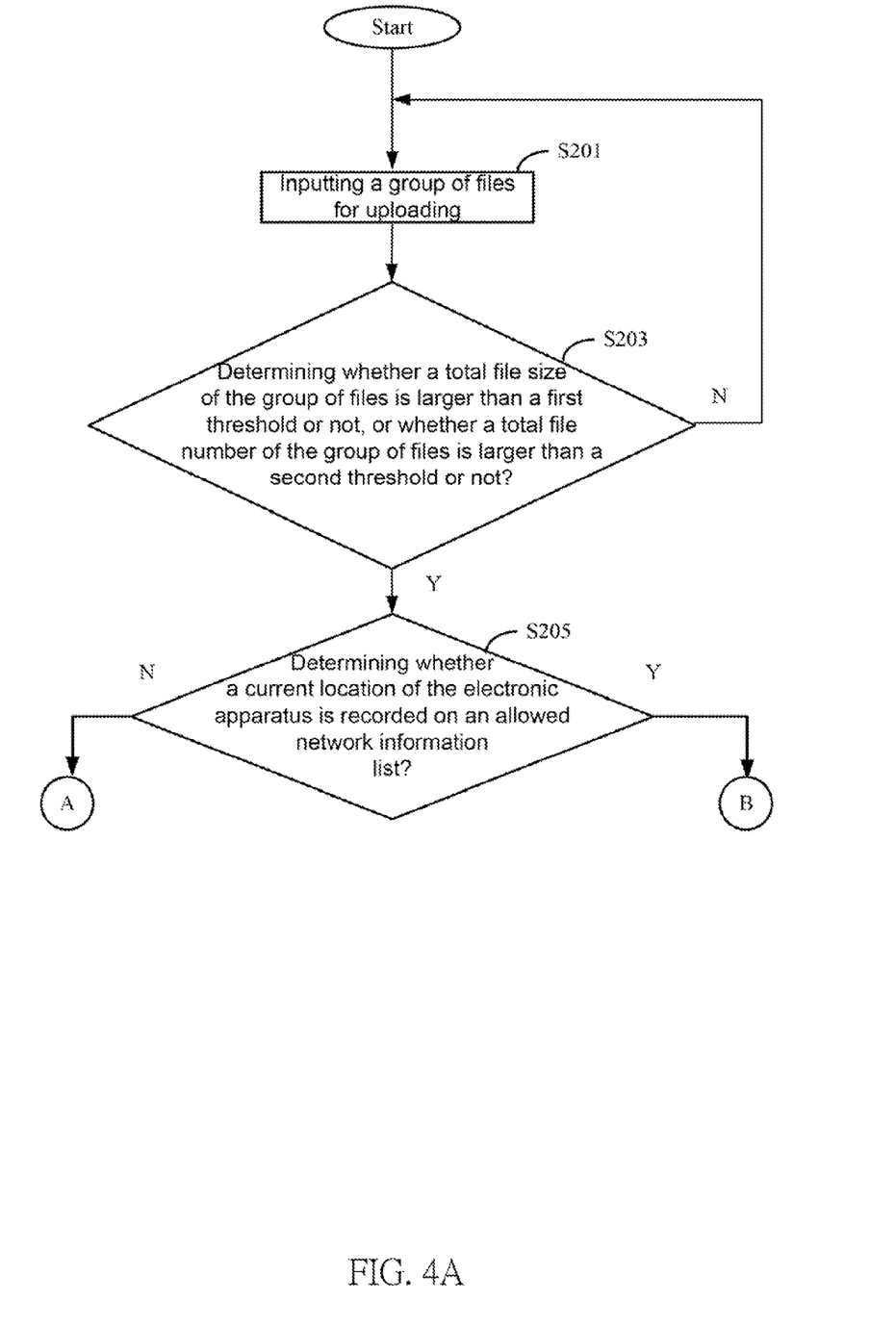
FIGS. 4A-4C are flowcharts of an uploading method according to one embodiment of the present invention.
Figure 4B:
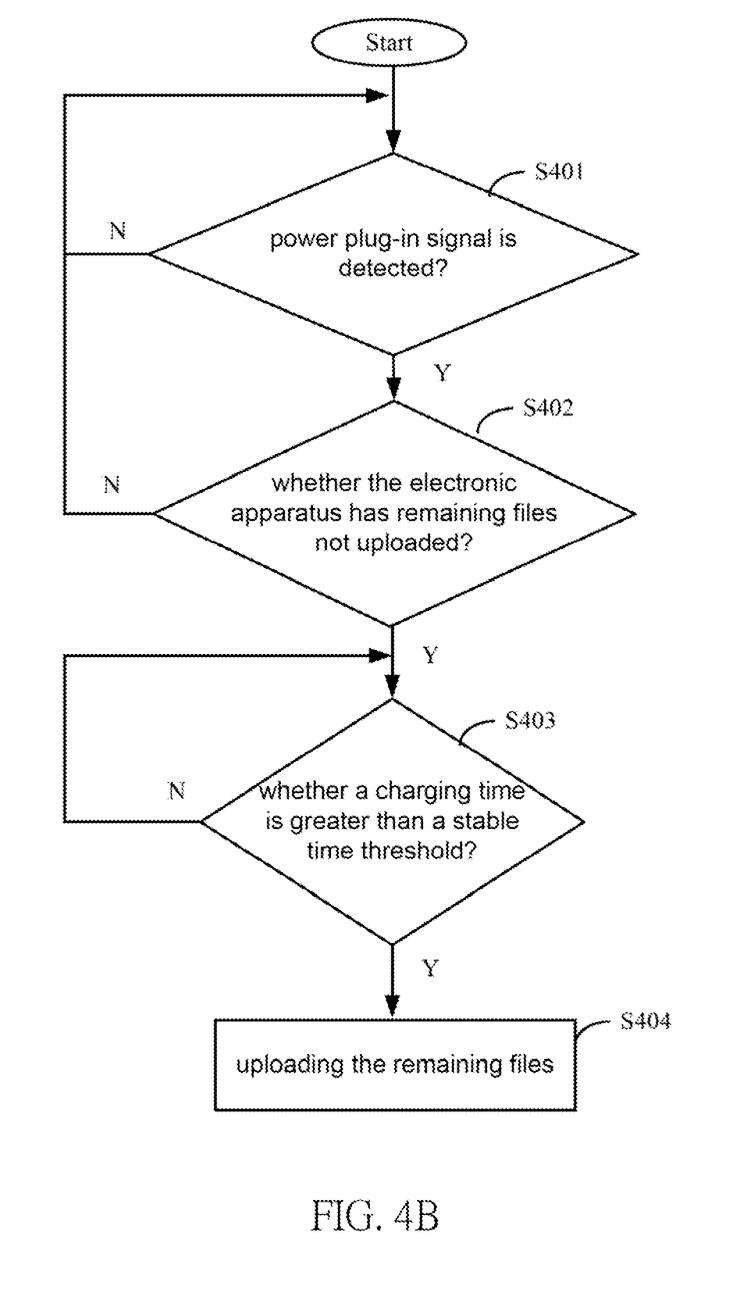
Figure 4C:
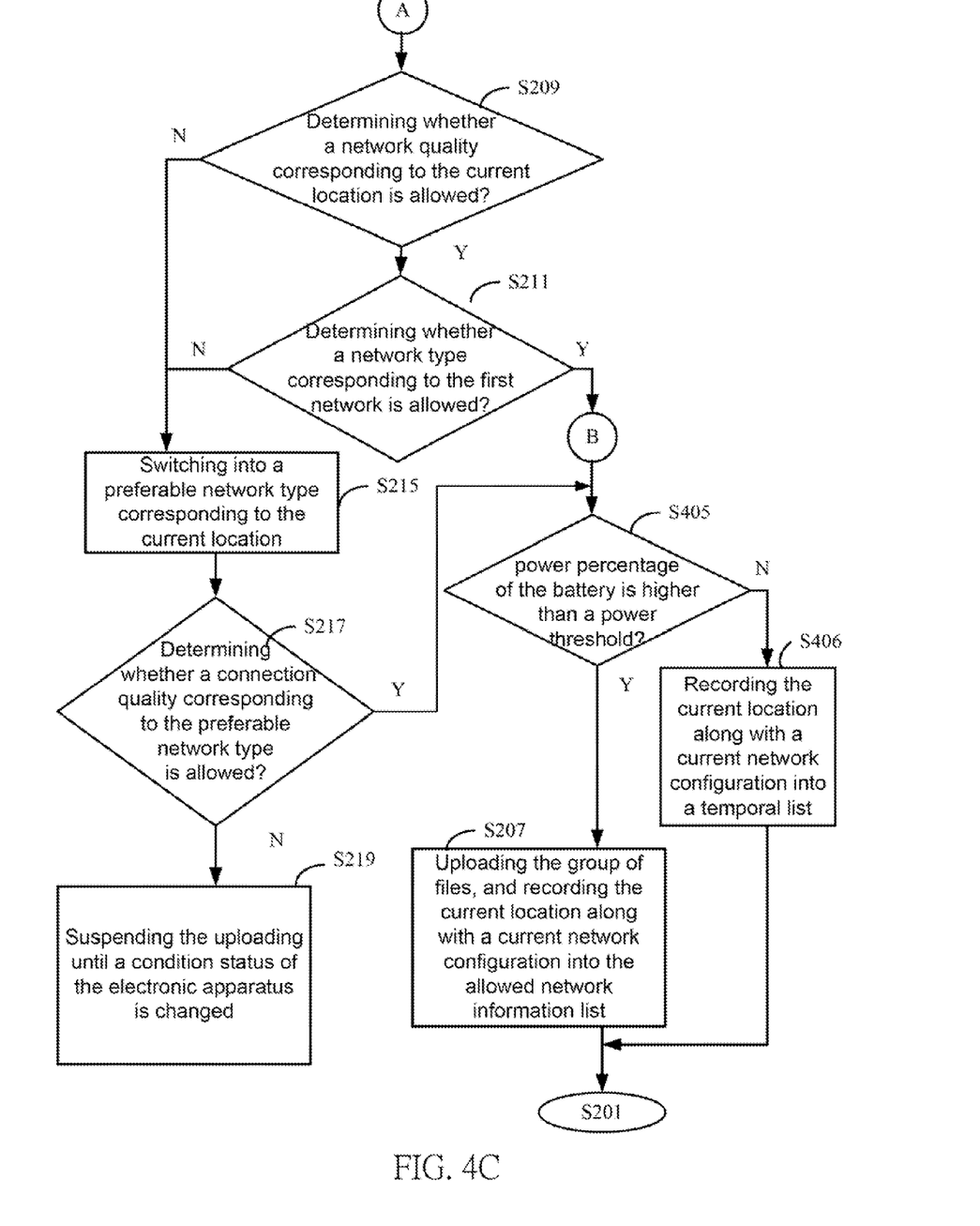

Please referred to FIGS. 4A-4C, FIGS. 4A-4C are flowcharts of an uploading method according to one embodiment of the present invention. In one embodiment, in step S203, if the total file size of the group of files is not larger than the first threshold and the total file number of the group of files is not larger than the second threshold, step S401 is performed. However, the present disclosure is not limited to enter step S401 only after step S203. According to aforesaid embodiment, the electronic apparatus 100 will have some photo/video files on a waiting list. These photo/video files will not be uploaded until their size/amount exceeds a specific standard. Therefore, there will be some fragment files, which are not uploaded and existed on the electronic apparatus 100. In another embodiment, when a charging wiring is connected to the electronic apparatus 100, the electronic apparatus 100 will detects a power plug-in signal. In this case, the electronic apparatus 100 can utilizes the power from the charging wiring, and the power consumption is no longer an important issue in this condition. The power plug-in signal can be configured to trigger the electronic apparatus 100 to upload these remaining files.

In step S401, the processor 130 detects whether a power plug-in signal is detected (which is generated when the electronic apparatus 100 is connected to a power wiring). If the processor 130 detects the status of the electronic apparatus 100 is in "power charging plug-in", the step S402 is performed. If the processor 130 detects the status of the electronic apparatus 100 is not in "power charging plug-in", the next step goes back to S401.

In more detailed, if the electronic apparatus 100 receives the "charging plug-in" signal, the processor 130 determines that the electronic apparatus 100 is in "power charging plug-in" state and the battery 150 is charging.

In step S402, the processor 130 checks whether the electronic apparatus 100 has remaining files not uploaded. If the electronic apparatus 100 has remaining files not uploaded, the step S403 is performed. If the electronic apparatus 100 does not have remaining files not uploaded, the next step goes back to S401. For example, the remaining files can be a small group of files, which the total file size is smaller than the first threshold and the total file number is smaller than the second threshold. These remaining files will not be uploaded due to the condition limited in step S203, and these remaining files will be further determined whether to be uploaded or not according to the conditions in step S403.

In step S403, the processor 130 checks whether the charging time is greater than the stable time threshold. If the processor 130 checks the charging time is greater than the stable time threshold (e.g. the stable time threshold is 20 minutes), step S404 is performed.

In step S404, the network component 140 uploads the remaining files.

In this manner, the "charging plug-in" signal triggers an event to check whether the electronic apparatus 100 has remaining files not uploaded. Then, the network component 140 uploads the remaining files if the battery is stable charged over the stable time threshold.

In another embodiment, the step S405 is further performed after step S211 and 205. In step S405, the processor 130 further determines whether the power percentage of the battery 150 is higher than a power threshold. If the power percentage of the battery 150 is higher than the power threshold, the step S207 is performed. In step S207, the network component 140 uploads the group of files, and the storage device 110 records the current location along with a current network configuration into an allowed network information list.

If the power percentage of the battery is not higher than the power threshold, the step S406 is performed.

In step 3406, the storage device 110 records the current location along with a current network configuration into a temporal list.

Besides, the other technological features of components, steps and applications of FIGS. 4A-4C are the same as those of the aforementioned embodiment, and detailed descriptions thereof will be omitted.

In this embodiment, the uploading method can further consider the battery condition to help the stability of the uploading process. However, the present disclosure is not limited in this regard, another communication technology is within the contemplate scope of the present disclosure.

Although the present invention has been described in considerable detail with reference to certain embodiments thereof, other embodiments are possible. Therefore, the scope of the appended claims should not be limited to the description of the embodiments contained herein.

What is claimed is:
1. An uploading method for an electronic apparatus, comprising:
generating a group of files; and
determining whether a total file size of the group of files is larger than a first threshold or not, or whether a total file number of the group of files is larger than a second threshold by a processor or not;
if at least one of the total file size or the total file number of the group of files is larger than the first threshold or the second threshold, selectively uploading the group of files according to a current status of the electronic apparatus;
wherein the step of selectively uploading the group of files further comprising:
determining whether a current location of the electronic apparatus is recorded on an allowed network information list stored in a storage device;
if the current location of the electronic apparatus is recorded on the allowed network information list, uploading the group of files according to an allowed network configuration corresponding to the current location.

2. The uploading method of claim 1, further comprises:
determining whether a network quality corresponding to a first network established by the electronic apparatus at the current location is allowed and whether a network type corresponding to the first network is allowed;
if the network quality corresponding to a first network established by the electronic apparatus at the current location is allowed and the network type corresponding to the first network is allowed, uploading the group of files, and recording the current location along with a current network configuration into the allowed network information list;
if the current location of the electronic apparatus is not recorded on the allowed network information list, performing a network selecting process related to the current location.

3. The uploading method of claim 2, wherein the network selecting process further comprises:
if the network quality corresponding to a first network established by the electronic apparatus at the current location is not allowed or the network type corresponding to the first network is not allowed, switching into a preferable network type corresponding to the current location;
determining whether a connection quality corresponding to the preferable network type is allowed;
if the connection quality corresponding to the preferable network type is allowed, uploading the group of files, and recording the current location along with the current network configuration into the allowed network information list.

4. The uploading method of claim 3, wherein the network selecting process further comprises:
if the connection quality corresponding to the preferable network type is not allowed;
suspending the uploading until after a period of time or until a network status, a network provider, or the current location of the electronic apparatus is changed.

5. The uploading method of claim 1, further comprises:
detecting whether a power plug-in signal is detected;
if the power plug-in signal is detected, checking whether the electronic apparatus has a plurality of remaining files not uploaded.

6. The uploading method of claim 5, wherein if the electronic apparatus has the remaining files not uploaded, checking whether a charging time is greater than a stable time threshold; and
uploading the remaining files if the charging time is greater than the stable time threshold.

7. The uploading method of claim 2, wherein if the network type corresponding to the first network is allowed the step further comprising:
determining whether a power percentage of a battery is higher than a power threshold;
if the power percentage of the battery is higher than the power threshold, uploading the group of files, and recording the current location along with a current network configuration into a allowed network information list.

8. An electronic apparatus, comprising:
a storage device;
a processor for generating a group of files for uploading, and for determining whether a total file size of the group of files is larger than a first threshold or not, or whether a total file number of the group of files is larger than a second threshold or not; and
a network component for selectively uploading the group of files according to a current status of the electronic apparatus if at least one of the total file size or the total file number of the group of files is larger than the first threshold or the second threshold;
wherein the processor further determines whether a current location of the electronic apparatus is recorded on an allowed network information list stored in the storage device:
if the current location of the electronic apparatus is recorded on the allowed network information list, the processor uploads the group of files according to an allowed network configuration corresponding to the current location.

9. The electronic apparatus of claim 8, wherein the processor further determines whether a network quality corresponding to a first network established by the electronic apparatus at the current location is allowed and whether a network type corresponding to the first network is allowed;
if the network quality corresponding to a first network established by the electronic apparatus at the current location is allowed and the network type corresponding to the first network is allowed, the network component further uploads the group of files, and recording the current location along with a current network configuration into the allowed network information list; and
if the current location of the electronic apparatus is not recorded on the allowed network information list, the processor performs a network selecting process related to the current location.

10. The electronic apparatus of claim 9, wherein if the network quality corresponding to a first network established by the electronic apparatus at the current location is not allowed or the network type corresponding to the first network is not allowed, the network component switches into a preferable network type corresponding to the current location:
the processor further determines whether a connection quality corresponding to the preferable network type is allowed;
if the connection quality corresponding to the preferable network type is allowed, the network component uploads the group of files, and the storage device records the current location along with the current network configuration into the allowed network information list.

11. The electronic apparatus of claim 10, wherein if the connection quality corresponding to the preferable network type is not allowed;

the processor suspends the uploading until after a period of time or until a network status, a network provider, or the current location of the electronic apparatus is changed.

12. The electronic apparatus of claim 8, wherein the processor further detects whether a power plug-in signal is received;
    if the power plug-in signal is received, the processor checks whether the electronic apparatus has a plurality of remaining files not uploaded.

13. The electronic apparatus of claim 12, wherein if the electronic apparatus has the remaining files not uploaded, the processor further checks whether a charging time is greater than a stable time threshold; and
    uploading the remaining files if the charging time is greater than the stable time threshold.

14. The electronic apparatus of claim 9, wherein if the network type corresponding to the first network is allowed, the processor determines whether a power percentage of a battery is higher than a power threshold;
    if the power percentage of the battery is higher than the power threshold, uploading the group of files, and recording the current location along with a current network configuration into a allowed network information list.

15. A non-transitory computer readable medium for performing an uploading method, the uploading method comprising:
    determining whether a total file size of the group of files is larger than a first threshold or not, or whether a total file number of the group of files is larger than a second threshold by a processor or not;
    if at least one of the total file size or the total file number of the group of files is larger than the first threshold or the second threshold, selectively uploading the group of files according to a current status of the electronic apparatus;
    wherein the step of selectively uploading the group of files further comprising:
    determining whether a current location of the electronic apparatus is recorded on an allowed network information list stored in a storage device;
    if the current location of the electronic aparatus is recorded on the allowed network information list, uploading the group of files according to an allowed network configuration corresponding to the current location.

16. The non-transitory computer readable medium of claim 15, wherein the step of selectively uploading the group of files further comprising:
    determining whether a network quality corresponding to a first network established by the electronic apparatus at the current location is allowed and whether a network type corresponding to the first network is allowed;
    if the network quality corresponding to a first network established by the electronic apparatus at the current location is allowed and the network type corresponding to the first network is allowed, uploading the group of files, and recording the current location along with a current network configuration into the allowed network information list;
    if the current location of the electronic apparatus is not recorded on the allowed network information list, performing a network selecting process related to the current location;
    wherein the network selecting process further comprises:
    if the network quality corresponding to a first network established by the electronic apparatus at the current location is not allowed or the network type corresponding to the first network is not allowed, switching into a preferable network type corresponding to the current location;
    determining whether a connection quality corresponding to the preferable network type is allowed;
    if the connection quality corresponding to the preferable network type is allowed, uploading the group of files, and recording the current location along with the current network configuration into the allowed network information list;
    if the connection quality corresponding to the preferable network type is not allowed;
    suspending the uploading until after a period of time or until a network status, a network provider, or the current location of the electronic apparatus is changed.

17. The non-transitory computer readable medium of claim 16, further comprises:
    detecting whether a power plug-in signal is detected;
    if the power plug-in signal is detected, checking whether the electronic apparatus has a plurality of remaining files not uploaded;
    if the electronic apparatus has the remaining files not uploaded, checking whether a charging time is greater than a stable time threshold; and
    uploading the remaining files if the charging time is greater than the stable time threshold;
    wherein if the network type corresponding to the first network is allowed the step further comprising:
    determining whether a power percentage of a battery is higher than a power threshold;
    if the power percentage of the battery is higher than the power threshold, uploading the group of files, and recording the current location along with a current network configuration into a allowed network information list.

\* \* \* \* \*